United States Patent [19]

Newman, Jr. et al.

[11] Patent Number: 5,743,577
[45] Date of Patent: Apr. 28, 1998

[54] EXTENSION HANDLE APPARATUS

[75] Inventors: Robert D. Newman, Jr.; Robert D. Newman, Sr., both of P.O. Box 377, Greenwood, Mo. 64034; Buford Guittar, Greenwood, Mo.

[73] Assignees: Robert D. Newman, Sr.; Robert D. Newman, Jr., both of Greenwood, Mo.

[21] Appl. No.: 685,456

[22] Filed: Jul. 19, 1996

[51] Int. Cl.$^6$ .................................. B25J 1/02; F16B 7/14
[52] U.S. Cl. ........................ 294/19.1; 403/109; 403/351
[58] Field of Search .................... 294/19.1, 19.2, 294/22; 15/144.4; 16/115; 403/104, 109, 350, 351, 377, 378

[56] References Cited

U.S. PATENT DOCUMENTS

| | | | |
|---|---|---|---|
| 2,432,059 | 12/1947 | Zipser | 403/350 |
| 2,517,700 | 8/1950 | Odin | 403/351 |
| 2,992,026 | 7/1961 | Farber | 403/351 |
| 4,508,467 | 4/1985 | Choffin | 294/19.1 X |
| 4,659,125 | 4/1987 | Chuan | 294/19.2 |
| 5,220,707 | 6/1993 | Newman, Sr. et al. | |
| 5,322,334 | 6/1994 | Hammer | |
| 5,324,086 | 6/1994 | Hammer | |
| 5,385,420 | 1/1995 | Newman, Sr. et al. | |
| 5,460,458 | 10/1995 | Caceres | |
| 5,502,864 | 4/1996 | Sorenson | 294/19.1 X |

*Primary Examiner*—Johnny D. Cherry
*Attorney, Agent, or Firm*—Hovey, Williams, Timmons & Collins

[57] ABSTRACT

A tool reach extension pole includes an inner slider tube 12 telescopically received in an open end of an outer handle tube 10 for relative longitudinal shifting movement. The slider tube 12 includes a radially extending hole within which a locking pin 48 is received, and the pin extends through a slot 22 formed in the handle tube 10. The pin 48 includes a head 50 having a width greater than that of the slot 22, and is received in a circumferentially extending eccentric slot of a locking grip 52 that is rotatable and longitudinally shiftable relative to the handle tube 10. By providing this construction, longitudinal shifting movement of the locking grip 52 relative to the handle tube 10 is transmitted to the slider tube 12 by the locking pin 48, and rotational movement of the locking grip relative to the handle tube shifts the locking pin within the slider tube hole between a locked position in which the handle tube 10 and slider tube 12 are locked against relative longitudinal shifting movement, and an unlocked position in which the handle tube and slider tube are longitudinally shiftable relative to one another.

8 Claims, 1 Drawing Sheet

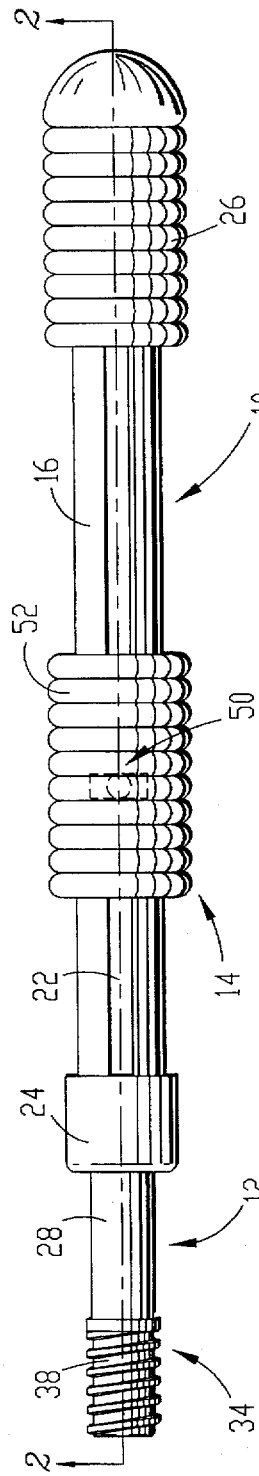
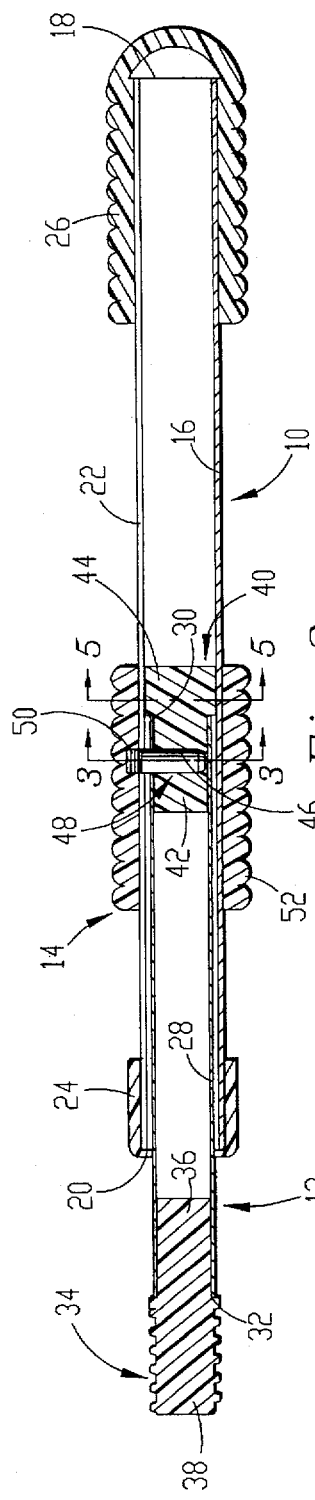
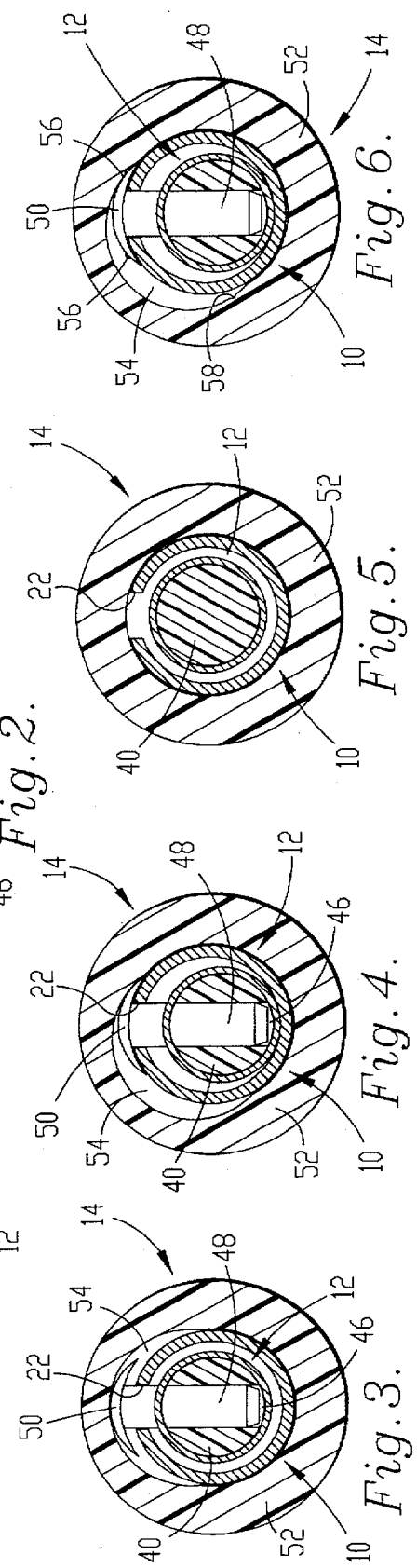

EXTENSION HANDLE APPARATUS

BACKGROUND OF THE INVENTION

1. Field of the Invention

The present invention relates generally to tool reach extension poles, and more particularly to an extension handle apparatus having a pair of relatively shiftable pole sections and a locking mechanism for locking the pole sections in any adjusted position.

2. Discussion of the Prior Art

It is known to provide a tool reach extension pole including an inner slider tube telescopically received in the open distal end of an outer handle tube for relative longitudinal shifting movement. A rigid connector is attached to the proximal end of the slider tube and protrudes through a longitudinally extending slot formed in the handle tube. The connector includes a handle element disposed outside of the handle tube by which the connector can be gripped to extend and retract the slider tube.

This construction allows dynamic adjustment of the length of the extension pole such that a user can use a tool supported at the end of the pole while at the same time making adjustments to the length of the pole. Thus, the user is able to maintain a comfortable, ergonomic posture while manipulating the pole to position and operate the tool. However, in order to maintain the relative longitudinal positions of the tubes, the user must hold the handle element of the connector in place, restricting the manner in which the user handles the pole once the pole is adjusted to a desired length.

OBJECTS AND SUMMARY OF THE INVENTION

It is an object of the present invention to provide a tool reach extension pole that provides the benefits of the conventional construction while additionally providing a locking mechanism for locking the pole tubes relative to one another in any desired position thereof.

It is another object of the present invention to provide a tool reach extension pole which incorporates a locking mechanism into a longitudinally shiftable grip on the handle tube so that a user is able to shift, lock and unlock the tubes without releasing or regripping the pole.

In accordance with these and other objects evident from the following description of a preferred embodiment of the invention, a tool reach extension pole includes an outer handle tube presenting an open distal end and a longitudinally extending slot of predetermined width, and an inner slider tube telescopically received within the handle tube for relative longitudinal shifting movement. The slider tube includes a proximal end received in the open distal end of the handle tube and an opposed distal end, and defines a radially extending hole adjacent the proximal end.

A locking pin is received in the radially extending hole of the slider tube and extends through the slot of the handle tube. The locking pin includes a head having a width greater than the predetermined width of the slot in the handle tube. A locking grip is supported on the handle tube for relative rotational and longitudinal shifting movement. The locking grip presents a cylindrical inner surface including a circumferentially extending eccentric slot, and the head of the locking pin is received in the slot so that longitudinal shifting movement of the locking grip relative to the handle tube is transmitted to the slider tube by the locking pin. In addition, rotation of the locking grip relative to the handle tube shifts the locking pin within the slider tube hole between a locked position in which the handle tube and slider tube are locked against relative longitudinal shifting movement, and an unlocked position in which the handle tube and slider tube are longitudinally shiftable relative to one another.

By providing a tool reach extension pole in accordance with the present invention, numerous advantages are realized. For example, by providing a locking mechanism between the tubes, it is possible for a user to adjust the pole to a desired length, lock it, and then reposition his or her hands at will as if the pole were formed of a single tube. It is not necessary for the user to manually maintain the relative positions of the tubes.

In addition, by incorporating the locking mechanism into the grip used to shift the slider tube relative to the handle tube, the shifting and locking functions can be performed on the fly, without regripping the pole. This feature of the invention allows the user to continue to use a tool supported on the end of the pole without interruption while repeatedly re-adjusting the length of the pole and locking it in place.

BRIEF DESCRIPTION OF THE DRAWING FIGURES

The preferred embodiment of the present invention is described in detail below with reference to the attached drawing figures, wherein:

FIG. 1 is a side elevational view of an extension handle apparatus constructed in accordance with the preferred embodiment;

FIG. 2 is a sectional view of the apparatus taken along line 2—2 of FIG. 1;

FIG. 3 is a sectional view thereof taken along line 3—3 of FIG. 2, illustrating a locking mechanism of the apparatus in an unlocked position;

FIG. 4 is a sectional view thereof taken along line 3—3 of FIG. 2, illustrating the locking mechanism in a locked position;

FIG. 5 is a sectional view thereof taken along line 5—5 of FIG. 2; and

FIG. 6 is a sectional view similar to FIG. 3 of an alternate embodiment of the apparatus.

DETAILED DESCRIPTION OF THE PREFERRED EMBODIMENT

A tool reach extension pole constructed in accordance with the preferred embodiment is illustrated in FIG. 1, and broadly includes an outer handle tube 10, an inner slider tube 12, and a grip assembly 14.

The handle tube includes a body 16, as shown in FIG. 2, which is constructed of a unitary piece of cylindrical metal tube stock having a proximal end 18, an opposed distal end 20, and a slot 22 extending longitudinally between the ends. A retention collar 24 is fitted on the distal end of the handle tube and includes a reduced diameter flange at the distal end thereof which is of a diameter smaller than the inner diameter of the handle tube and slightly greater than the outer diameter of the slider tube. A handle 26 is fitted on the proximal end of the handle tube 10 and presents a synthetic resin grip by which the handle tube can be held. The handle is secured in place by an adhesive or the like, and closes off the proximal end 18 of the handle tube.

The slider tube 12 includes a body 28 that is constructed of a unitary piece of cylindrical metal tube stock having a proximal end 30 and an opposed distal end 32. However, the slider tube is provided with an outer diameter smaller than the inner diameter of the handle tube 10 so that the slider tube can be received within the handle tube for relative longitudinal, telescopic movement into and out of the handle tube. A threaded fitting 34 is secured to the distal end of the slider tube and defines a means for supporting a conventional tool on the pole so that the pole can be used to extend the reach of the tool. The fitting includes a first end 36 having a cylindrical outer surface that engages the inner surface of the slider tube, and a second, distal end 38 that is threaded for receipt of the tool. An intermediate flange separates the two ends from one another and defines a shoulder against which the distal end of the slider tube abuts when the fitting is positioned on the slider tube. Preferably, an adhesive or other suitable fastening expedient is used to secure the fitting to the slider tube.

A tube guide plug 40 is secured to the proximal end of the slider tube 12, and includes a first end 42 having a cylindrical outer surface that engages the inner surface of the slider tube, and a second end 44 that protrudes from the proximal end 30 within the handle tube 10. The second end 44 of the plug is of a diameter greater than the outer diameter of the slider tube 12, and engages the inner surface of the handle tube to guide relative longitudinal shifting movement of the tubes. An adhesive or other suitable fastening expedient is preferably used to secure the fitting to the slider tube.

A radially extending hole 46 is provided in the guide plug 40 and the slider tube 12 adjacent the proximal end of the slider tube, and a locking pin 48 is received in the hole and protrudes through the longitudinal slot 22 in the handle tube 10. The hole restricts all movement of the pin relative to the slider tube except for radial movement along the axis of the pin. Likewise, the slot 22 restricts side-to-side movement of the pin such that the slider tube 12 is prevented from rotating about its axis relative to the handle tube 10.

The locking pin 48 includes a head 50 that is disposed outside of the handle tube 10. As shown in FIG. 3, the upper surface of the head is arched, and the plan view shape of the head as depicted in phantom lines in FIG. 1, is rectangular, presenting a pair of longitudinally spaced, parallel side walls and two laterally spaced, longitudinally extending end edges. As such, the side walls each present a crescent shape when viewed from an end of the pole, as shown in FIGS. 3–5.

As shown in FIG. 2, the locking pin 48 forms a part of the grip assembly 14 which also includes a tubular locking grip 52. The locking grip is preferably formed of synthetic resin material, presenting longitudinally opposed proximal and distal ends, an inner diameter sized for longitudinal and rotational sliding engagement on the outer surface of the handle tube 10, and an outer gripping surface by which the grip can be manipulated. As shown in FIG. 5, the inner surface of the grip is cylindrical, and an inner, circumferentially extending slot 54 is formed in the grip, as shown in FIG. 3, and defines a recess in the inner surface within which the head 50 of the locking pin 48 is received. The slot 54 defines a cam surface that is arched, and the plan view shape of the surface is rectangular such that the slot presents a pair of longitudinally spaced, parallel side walls and two laterally spaced, longitudinally extending end edges. As such, the side walls of the slot each present a crescent shape when viewed from an end elevational perspective. The spacing between the side walls of the slot 54 is equal to or slightly greater than the distance between the side walls of the head 50 so that longitudinal shifting movement of the grip 52 along the handle tube is transmitted to the pin 48 and to the slider tube 12. The circumferential dimension of the slot 54 is greater than the distance between the end edges of the head 50, and the slot includes a radial depth that is greater than the radial thickness of the head so that the grip can be rotated on the handle tube relative to the locking pin.

With reference to FIG. 1, during use of the tool reach extension pole, a conventional tool such as a paint roller, brush, or squeegee is threaded onto the end fitting 34 of the pole. Thereafter, the user is able to extend the reach of the tool by extending and retracting the slider tube 12 relative to the handle tube 10. Such adjustment is carried out by gripping the handle with one hand and the locking grip with the other hand, and then shifting the locking grip along the length of the handle tube. As shown in FIG. 2, the grip 52 engages the locking pin 48 which, in turn, is received in the hole 46 of the slider element such that longitudinal movement of the grip is transmitted to the slider tube and moves the slider tube relative to the handle tube.

This construction allows the user to adjust the length of the pole on the fly such that it is possible to keep the tool in use during such adjustment. For example, in the use of a paint roller, the user can stand in a natural position and manipulate the pole to roll the roller back and forth in a paint pan or against a wall. It is not necessary for the user to repeatedly bend over to reach the paint pan or to repeatedly extend his or her reach to paint a remote area of a wall or ceiling.

If the user wishes to lock the tubes together so that they can be handled as a single unitary pole, he or she simply twists the locking grip in either direction from the unlocked position shown in FIG. 3, so that the cam surface defined by the slot 54 engages the head 50 of the locking pin 48 and forces the pin into the hole of the slider tube 12. As shown in FIG. 4, the cam surface pinches the head of the locking pin between the grip 52 and the outer surface of the handle tube 10 in the locked position, and forces the pin against the slider tube so that the slider tube is pushed radially against the inner surface of the handle tube. The combined frictional effect between the grip, pin, handle tube and slider tube locks the slider tube in place against further longitudinal movement. In order to unlock the slider tube, the grip 52 is turned away from the locked position of FIG. 4 to the unlocked position shown in FIG. 3.

The crescent shape of the slot 54 permits the grip 52 to be twisted in either direction from the unlocked position in order to lock the tubes relative to one another.

However, in order to unlock the tubes, it is necessary to twist the grip in a direction opposite to the direction in which the grip is rotated during locking.

By incorporating a locking mechanism in the grip assembly, several advantages are realized. For example, the construction permits a user to both adjust the length of the pole, and to lock and unlock the tubes in a single position of the hands on the pole. It is not necessary that the user actually grip both tubes in order to shift them relative to one another or to lock them in an adjusted position.

An alternate construction of the preferred embodiment is illustrated in FIG. 6, wherein the head 50 of the locking pin 48 is provided with a pair of laterally spaced, longitudinally extending ridges 56 on the upper surface adjacent each end edge of the head. In addition, laterally spaced longitudinally extending grooves 58 are provided on the cam surface of the slot 54 in the grip 52 adjacent the end edges of the slot. The ridges on the head engage the grooves in the slot when the grip is rotated to the locked position shown in FIG. 6, providing a tactile indication that the pole is locked.

Although the present invention has been described with reference to the preferred embodiment, it is noted that equivalents may be employed and substitution made herein without departing from the scope of the invention as recited in the claims.

What is claimed is:

1. A tool reach extension pole comprising:

an outer handle tube presenting an open distal end and a longitudinally extending slot of predetermined width;

an inner slider tube telescopically received within the handle tube for relative longitudinal shifting movement, the slider tube including a proximal end received in the open distal end of the handle tube and an opposed distal end, and defining a radially extending hole adjacent the proximal end;

a locking pin received in the radially extending hole of the slider tube and extending through the slot of the handle tube, the locking pin including a head having a width greater than the predetermined width of the slot in the handle tube;

a locking grip supported on the handle tube for relative rotational and longitudinal shifting movement, the locking grip presenting a cylindrical inner surface including a circumferentially extending eccentric slot, the head of the locking pin being received in the slot so that longitudinal shifting movement of the locking grip relative to the handle tube is transmitted to the slider tube by the locking pin, and rotational movement of the locking grip relative to the handle tube shifts the locking pin within the slider tube hole between a locked position in which the handle tube and slider tube are locked against relative longitudinal shifting movement, and an unlocked position in which the handle tube and slider tube are longitudinally shiftable relative to one another.

2. A tool reach extension pole as recited in claim 1, wherein the longitudinally extending slot extends the full length of the handle tube.

3. A tool reach extension pole as recited in claim 1, wherein the handle tube is formed of metal.

4. A tool reach extension pole as recited in claim 1, wherein the handle tube includes a proximal end opposite the open distal end, the pole further comprising a handle secured to the proximal end of the handle tube, and a retaining means mounted at the open distal end of the handle tube for retaining the proximal end of the slider tube within the handle tube.

5. A tool reach extension pole as recited in claim 1, wherein the eccentric slot of the locking grip and the head of the locking pin are each crescent shaped in cross section, the slot being oversized relative to the head.

6. A tool reach extension pole as recited in claim 5, further comprising a detent means for providing a tactile indication that the locking grip is in the locked position.

7. A tool reach extension pole as recited in claim 1, further comprising a guide plug protruding from the proximal end of the slider tube within the handle tube for guiding longitudinal shifting movement of the slider tube, the guide plug extending into the slider tube and including a radially extending hole aligned with the radially extending hole in the slider tube so that the locking pin is supported in the holes for relative radial movement.

8. A tool reach extension pole as recited in claim 1, further comprising a threaded end fitting supported on the distal end of the slider tube.

* * * * *